United States Patent
Matsunaga

(10) Patent No.: US 8,928,670 B2
(45) Date of Patent: Jan. 6, 2015

(54) MOVING IMAGE GENERATION APPARATUS AND MOVING IMAGE GENERATION METHOD

(75) Inventor: Takuya Matsunaga, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 592 days.

(21) Appl. No.: 12/907,708

(22) Filed: Oct. 19, 2010

(65) Prior Publication Data
US 2011/0090246 A1     Apr. 21, 2011

(30) Foreign Application Priority Data

Oct. 21, 2009   (JP) ................................ 2009-242706

(51) Int. Cl.
| | | |
|---|---|---|
| *G06T 13/00* | (2011.01) | |
| *G06T 11/60* | (2006.01) | |
| *G09G 5/00* | (2006.01) | |
| *H04N 5/232* | (2006.01) | |
| *G06F 3/0488* | (2013.01) | |
| *G06T 11/00* | (2006.01) | |
| *G11B 27/034* | (2006.01) | |
| *G11B 27/28* | (2006.01) | |
| *G11B 27/34* | (2006.01) | |
| *H04N 5/262* | (2006.01) | |
| *H04N 5/77* | (2006.01) | |
| *H04N 21/4223* | (2011.01) | |
| *H04N 21/433* | (2011.01) | |
| *H04N 21/44* | (2011.01) | |
| *H04N 21/4728* | (2011.01) | |

(52) U.S. Cl.
CPC ........ *H04N 5/23293* (2013.01); *G06F 3/04883* (2013.01); *G06T 11/001* (2013.01); *G11B 27/034* (2013.01); *G11B 27/28* (2013.01); *G11B 27/34* (2013.01); *H04N 5/23219* (2013.01); *H04N 5/2621* (2013.01); *H04N 5/772* (2013.01); *H04N 21/4223* (2013.01); *H04N 21/4334* (2013.01); *H04N 21/44008* (2013.01); *H04N 21/4728* (2013.01)
USPC ........... 345/473; 345/419; 345/474; 345/620; 382/282; 382/305; 348/36; 358/450; 358/453

(58) Field of Classification Search
CPC ................................ G06T 11/60; G06T 13/00
USPC .......... 345/419, 474, 620, 473; 382/282, 305; 348/36; 358/450, 453
See application file for complete search history.

(56) References Cited

U.S. PATENT DOCUMENTS

| | | | | |
|---|---|---|---|---|
| 5,526,096 A | * | 6/1996 | Imada | 399/183 |
| 5,533,451 A | * | 7/1996 | Matsuo et al. | 101/415.1 |
| 5,960,124 A | * | 9/1999 | Taguchi et al. | 382/284 |

(Continued)

FOREIGN PATENT DOCUMENTS

JP    2006-115323    4/2006

*Primary Examiner* — Kimbinh T Nguyen
(74) *Attorney, Agent, or Firm* — John C. Pokotylo; Straub & Pokotylo

(57) ABSTRACT

A moving image generation apparatus includes an image display unit, a partial image specification unit, a partial image cutout unit, and a moving image generation unit. The image display unit displays an image. The partial image specification unit specifies a partial image of a predetermined range corresponding to each of points in the displayed image. The partial image cutout unit cuts out a plurality of partial images from between two arbitrary partial images included in the specified partial images. The moving image generation unit generates a moving image based on the specified partial images and the cutout partial images.

14 Claims, 16 Drawing Sheets

(56) References Cited

U.S. PATENT DOCUMENTS

| | | | |
|---|---|---|---|
| 6,311,258 B1 * | 10/2001 | Gibson et al. | 711/200 |
| 6,636,635 B2 * | 10/2003 | Matsugu | 382/218 |
| 6,701,017 B1 * | 3/2004 | Nagata et al. | 382/232 |
| 6,993,184 B2 * | 1/2006 | Matsugu | 382/173 |
| 7,103,232 B2 * | 9/2006 | Kotake et al. | 382/282 |
| 7,847,806 B2 * | 12/2010 | Mochizuki et al. | 345/619 |
| 7,859,551 B2 * | 12/2010 | Bulman et al. | 345/630 |
| 7,927,215 B2 * | 4/2011 | Sekimori | 463/32 |
| 8,312,374 B2 * | 11/2012 | Ozawa et al. | 715/702 |
| 8,363,019 B2 * | 1/2013 | Cho et al. | 345/173 |
| 8,549,403 B2 * | 10/2013 | Sitrick | 715/716 |
| 2010/0201707 A1 * | 8/2010 | Rasmussen et al. | 345/620 |

* cited by examiner

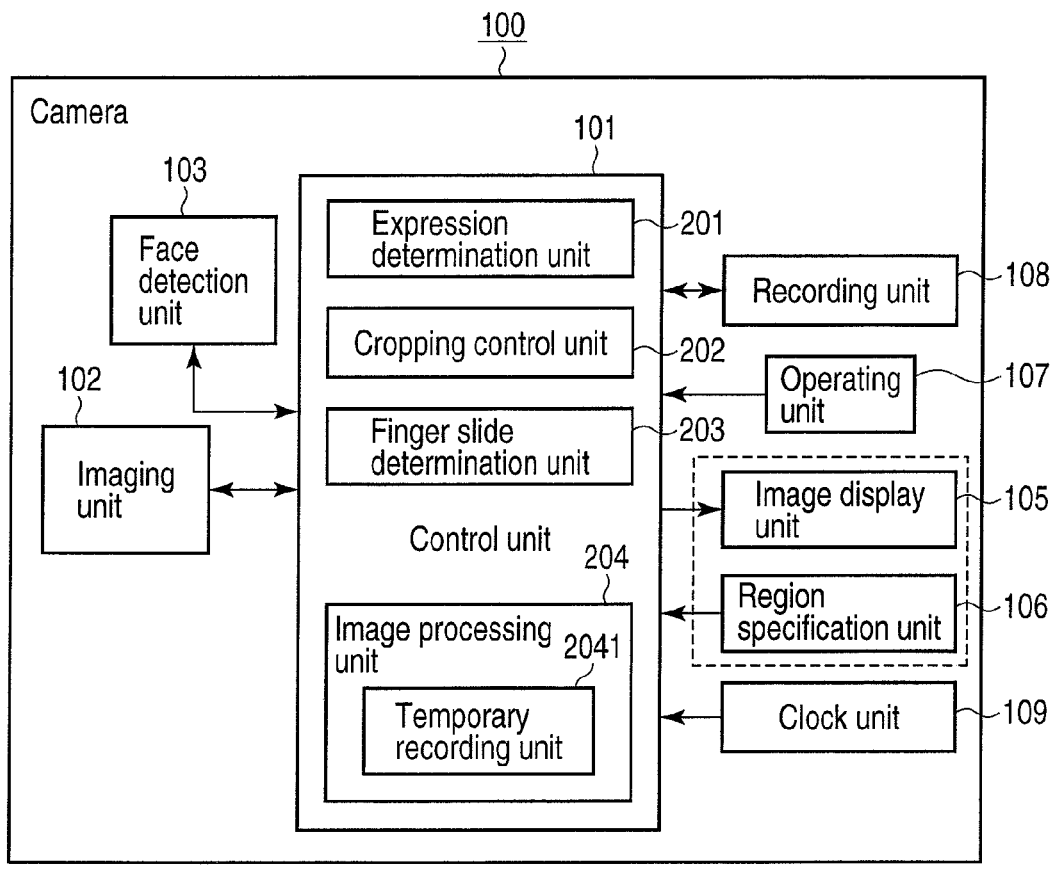
F I G. 1

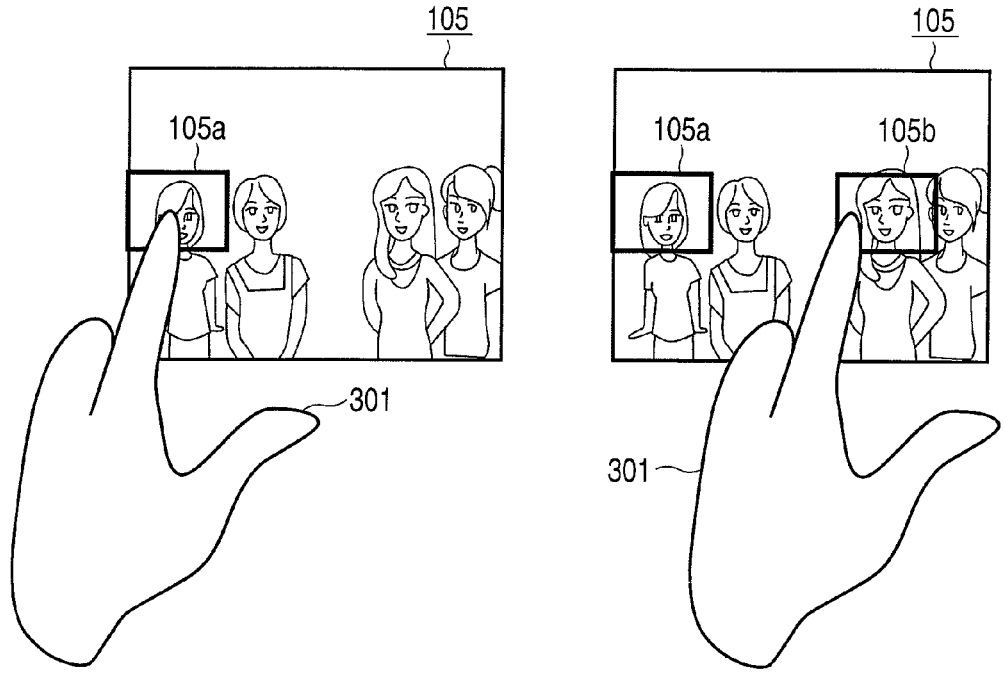
F I G. 2 A    F I G. 2 B
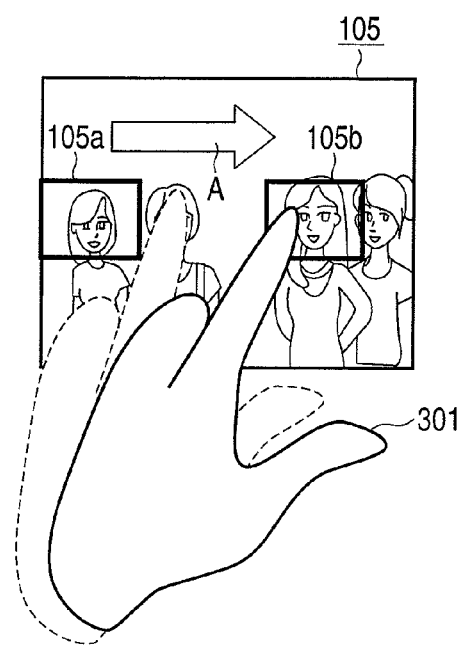
F I G. 2 C

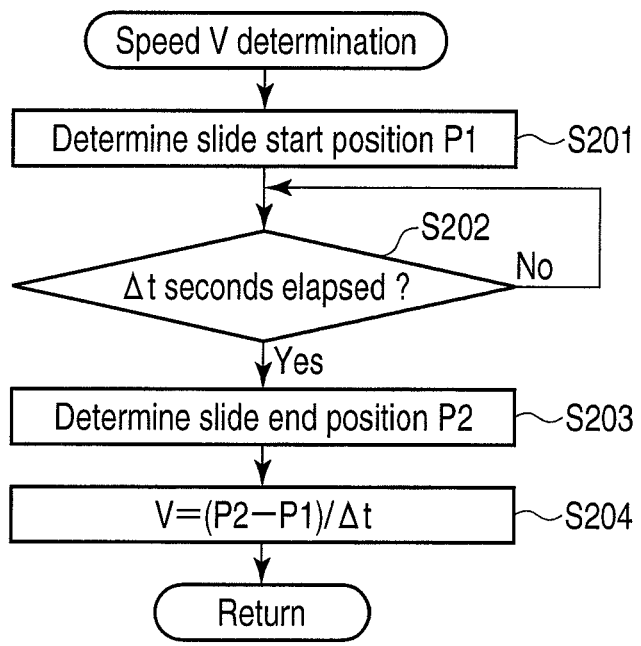
F I G. 5

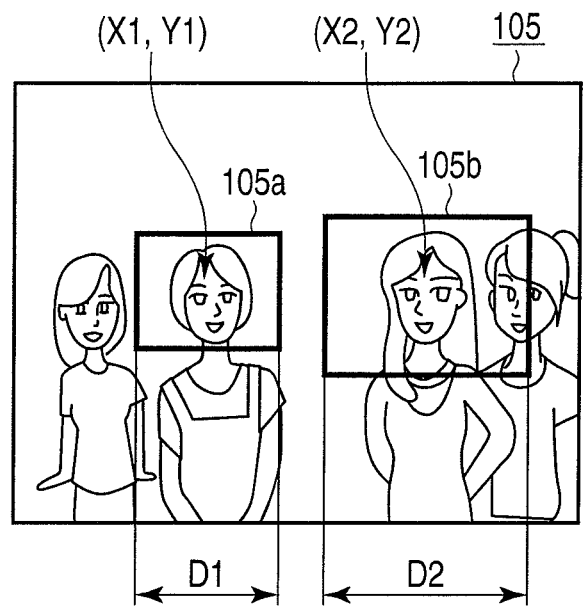
F I G. 7 A
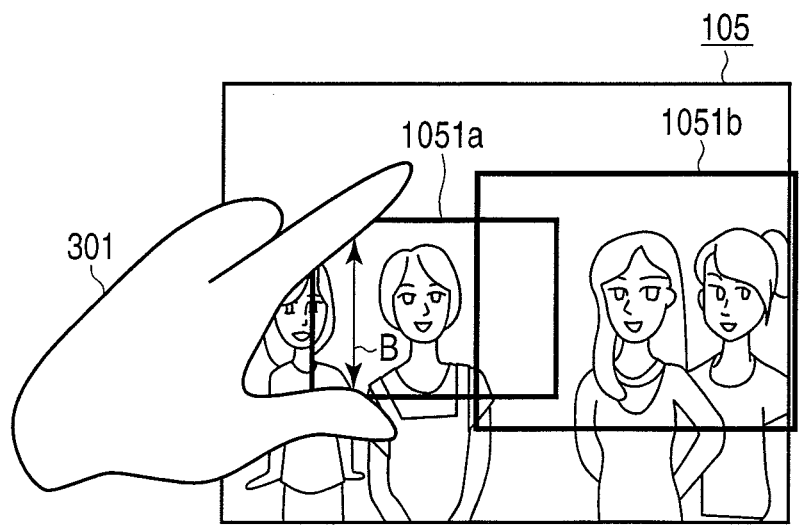
F I G. 7 B

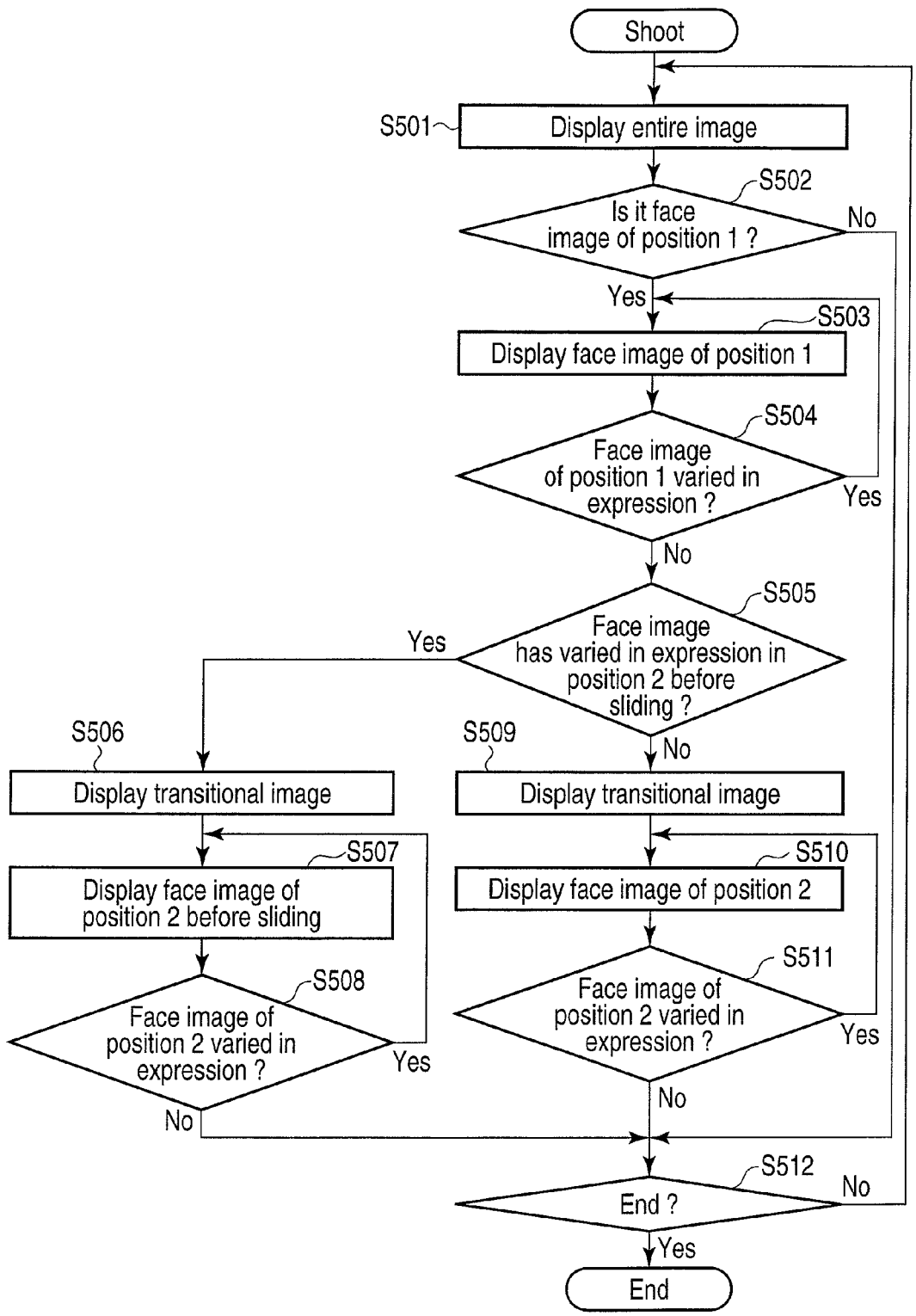
F I G. 10

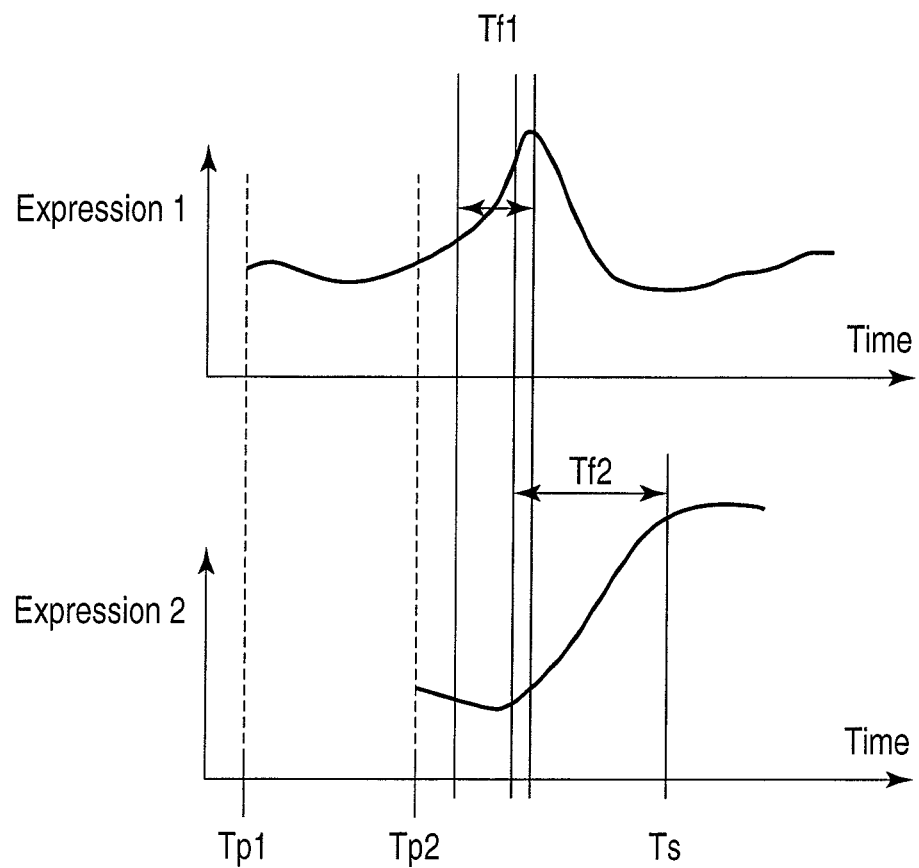
F I G. 1 1

MOVING IMAGE GENERATION APPARATUS AND MOVING IMAGE GENERATION METHOD

CROSS-REFERENCE TO RELATED APPLICATIONS

This application is based upon and claims the benefit of priority from prior Japanese Patent Application No. 2009-242706, filed Oct. 21, 2009, the entire contents of which are incorporated herein by reference.

BACKGROUND OF THE INVENTION

1. Field of the Invention

The present invention relates to a moving image generation apparatus for generating a moving image and a method for generating a moving image.

2. Description of the Related Art

In moving image photography, panning which refers to shooting while moving a camera vertically and horizontally is sometimes performed. During panning, a camera may fluctuate due to the shaking of the hands at the time of moving the camera. It is therefore difficult to shoot as the user intends. In order to prevent fluctuation of the camera, panning may be performed by attaching a camera to a tripod or an electric pan head. However, bringing a tripod or a pan head imposes inconvenience to the user. Further, while using a tripod or a pan head suppresses fluctuation of a camera, frictional resistance of the tripod or the pan head makes it difficult for the user to vary the shooting direction of the camera with a velocity and an acceleration so as to obtain a smooth panning effect. In order to solve such a problem, Jpn. Pat. Appln. KOKAI Publication No. 2006-115323 has been proposed. In Jpn. Pat. Appln. KOKAI Publication No. 2006-115323, during shooting of a moving image while panning a camera, the panning velocity of the acquired moving image is compensated for so as to approximate the referential panning velocity, based on the comparison result between the actual panning velocity of the camera and the referential panning velocity.

BRIEF SUMMARY OF THE INVENTION

According to a first aspect of the invention, there is provided a moving image generation apparatus comprising: an image display unit configured to display an image; a partial image specification unit configured to specify partial images of a predetermined range corresponding to points in the image displayed on the image display unit; a partial image cutout unit configured to cut out a plurality of partial images from between two arbitrary partial images included in the partial images specified by the partial image specification unit; and a moving image generation unit configured to generate a moving image based on the partial images specified by the partial image specification unit and the partial images cut out by the partial image cutout unit.

According to a second aspect of the invention, there is provided a moving image generation method comprising: causing a partial image specification unit to specify a partial image in a predetermined range corresponding to points of an image displayed on a display unit; causing a partial image cutout unit to cut out partial images from between two arbitrary partial images included in the partial images specified by the partial image specification unit; and causing a moving image generation unit to generate a moving image based on the partial images specified by the partial image specification unit and the partial images cut out by the partial image cutout unit.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 illustrates a configuration of a digital camera as an example of a moving image generation apparatus according to embodiments of the present invention;

FIGS. 2A, 2B, and 2C illustrate an outline of the operation of the moving image generating apparatus according to a first embodiment of the present invention;

FIG. 5 is a flowchart illustrating a speed V determination process;

FIGS. 7A and 7B illustrate the cropping range;

FIG. 10 is a flowchart illustrating the flow of a moving image playback method of a camera according to the second embodiment of the present invention;

FIG. 11 illustrates a relationship between time variation of the amount of variation in expression and a played-back face image;

DETAILED DESCRIPTION

Figure 3:
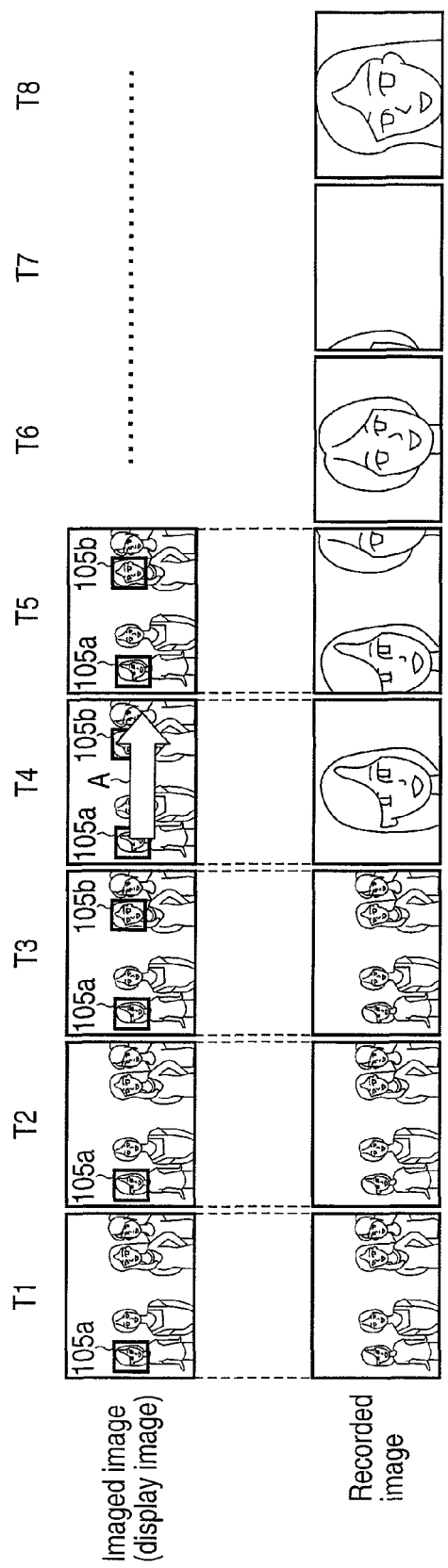
FIG. 3 illustrates the relationship between a shot image obtained by an imaging unit and an image actually recorded in a recording unit.

Hereinafter, embodiments of the present invention will be described with reference to the accompanying drawings.

First Embodiment

First embodiment of the present invention will be described. FIG. 1 illustrates a configuration of a digital camera (hereinafter simply referred to as a camera) as an example of a moving image generation apparatus according to the embodiments of the present invention. A camera 100 shown in FIG. 1 comprises a control unit 101, an imaging unit 102, a face detection unit 103, an image display unit 105, a region specification unit 106, an operation unit 107, a recording unit 108, and a clock unit 109.

The control unit 101 is a control circuit configured to collectively control the operation of each block of the camera 100. The control unit 101 performs an operation control of the imaging unit 102, the face detection unit 103, the image display unit 105, and the like, according to the operation of the region specification unit 106 and the operation unit 107 by the user.

The control unit 101 includes an expression determination unit 201, a cropping control unit 202, a finger slide determination unit 203, and an image processing unit 204.

The expression determination unit 201 determines the expression of the subject based on the face image detected by the face detection unit 103. The cropping control unit 202 specifies a specific range of the image obtained by the imaging unit 102 during moving image shooting as a cropping range, and cuts out the partial images in the specified cropping range. The finger slide determination unit 203 determines the finger slide speed (direction and speed) and whether a finger slide operation exists in the region specification unit 106. The cropping control unit 202 and the finger slide determination unit 203 embody functions as a partial image specification unit and as a partial image cutout unit. The image processing unit 204 performs image processing on the image obtained by the imaging unit 102. The image processing includes, for example, a color correction process on the image obtained by the imaging unit 102, a gradation correction process, a compression process (still image compression or moving image compression), a decompression process on the compressed image, and the like. Further, the image processing unit 204 includes a temporary recording unit 2041 configured to record a variety of data, such as the position of the cropping range, which will be described later. The temporary recording unit 2041 is formed of a RAM, for example.

The imaging unit 102 includes a lens, an aperture, an image pickup device, and the like. The imaging unit 102 images a subject under the control of the control unit 101, and acquires an image of the subject. The imaging unit 102 with this configuration has a function as a moving image generation unit, as the control unit 101 does. The face detection unit 103 detects a face portion (face image) in the image obtained by the imaging unit 102. The face detection unit 103 detects a face image by detecting a shadow of elements in a face, such as an eye, a nose, and a mouth, from an image. The face detection result by the face detection unit 103 is used for the lens focus adjustment, for example, by the imaging unit 102.

As described above, the expression determination unit 201 determines the expression of a subject based on a face image detected by the face detection unit 103. The expression determination unit 201 includes relation data between facial elements and expressions as a database, and determines the expression by comparing the facial element of the face image detected by the face detection unit 103 with the database.

The image display unit 105 is a display unit, such as a liquid crystal display (LCD) or an organic electro-luminescent display (GELD), provided on the back surface of the camera 100, for example. The image display unit 105 displays a variety of images, such as images obtained by the imaging unit 102 under the control of the control unit 101.

The region specification unit 106 is a touch panel integrally formed with the image display unit 105, for example, and is an operation unit configured to specify an arbitrary point on the display screen on the image display unit 105. The region specification unit 106 detects a contact of a finger of the user, for example, on the display screen of the image display unit 105, and outputs a signal according to the detected position to the control unit 101. The control unit 101 recognizes which point on the display screen of the image display unit 105 the contact has been made by identifying the signal from the region specification unit 106. Further, the finger slide determination unit 203 of the control unit 101 determines that a finger slide operation has been made when the point on the region specification unit 106 that a finger of the user, for example, contacts continually varies, and determines the finger slide speed (direction and speed) thereof.

The operation unit 107 is an operation unit of a variety of members other than the region specification unit 106. The operation unit 107 includes a power button, a release button, a zoom switch, a mode dial, and the like. The power button is an operation unit configured to instruct the camera 100 to be powered on or off. The release button is an operation unit configured to instruct the camera 100 to shoot (acquire an image for recording). The zoom switch is an operation unit configured to instruct the imaging unit 102 to drive the zoom. The mode dial is an operation unit configured to switch the operation mode of the camera to a shooting mode (still image or moving image) or to a playback mode.

The recording unit 108 records an image for recording obtained by the control unit 101. The recording unit 108 is a memory card detachably attached to the camera 100, for example. The clock unit 109 measures a variety of times, such as the time and date of shooting.

Hereinafter, the operation of the camera 100 as an example of a moving image generation apparatus according to a first embodiment of the present invention will be described. In the present embodiment, moving images with a smooth panning effect can be obtained through a simple operation.

When the camera 100 starts shooting moving images, continuous imaging is performed by the imaging unit 102, and the moving image obtained by the continuous imaging is displayed on the image display unit 105, and is recorded on the recording unit 108. In this stage, when a finger 301 of the user contacts an arbitrary point on the display screen of the image display unit 105, a face image in the vicinity of that point is detected by the face detection unit 103. When the face detection unit 103 has detected a face, the position of the face image is recorded in the temporary recording unit 2041. In the meantime, continuous imaging is continued by the imaging unit 102, and a frame 105a indicating the cropping range as shown in FIG. 2A is superimposed on the face image in the vicinity of the point specified by the user in the moving image displayed on the image display unit 105, according to the continuous imaging.

After that, when the user finger 301 contacts another point on the display screen of the image display unit 105, a face image in the vicinity of that point is detected by the face detection unit 103. When the face detection unit 103 has detected a face, the position of the face image is recorded in the temporary recording unit 2041. In the meantime, the continuous imaging by the imaging unit 102 is continued, and a frame 105b indicating the cropping range as shown in FIG. 2B is superimposed on the face image in the vicinity of that point specified by the user in the moving image displayed on the image display unit 105, according to the continuous imaging.

After that, the user slides the finger 301 in an arbitrary direction A on the display screen, as shown in FIG. 2C. Thereby, cropping shooting is performed, and a moving image with a panning effect as desired by the user is generated.

A description will be made with regard to cropping shooting. FIG. 3 illustrates the relationship between a shot image obtained by the imaging unit 102 and an image actually recorded in the recording unit 108, according to the first embodiment. As shown in FIG. 3, the overall shot image obtained by the shooting unit 102 is recorded in the recording unit 108 from timing T1, when the moving image shooting is started, to timing T3, when cropping shooting is started. In FIG. 3, the point is specified in timing T1 and timing T3, and the position of a face image in the vicinity of each of the specified points is recorded in the temporary recording unit 2041.

Cropping shooting is started from timing T4, when the finger slide operation is performed. In cropping shooting, a partial image corresponding to the face image (face image in the frame 105a) of the first point specified by the user in the shot image obtained by the imaging unit 102 is cut out in timing T4. The cutout partial image is expanded to a size the same as that of the shot image recorded in the recording unit 108 until then and recorded in the recording unit 108. In the next timing T5, a partial image of a position obtained by shifting the position of the frame 105a by a predetermined distance in A direction is cut out. The cutout partial image is also expanded to a size the same as that of the overall image, and is recorded in the recording unit 108. Similarly, partial images are cut out by shifting the cutout position by a predetermined distance in A direction, and the cutout partial image is expanded and recorded in the recording unit 108. In timing T8, when the partial image of the position of the frame 105b is cut out and is recorded in the recording unit 108, the cropping shooting is ended.

As a result, the final moving image recorded by the recording unit 108 in the first embodiment is an image obtained by combining the entire image obtained by the imaging unit 102 in the timings (timings T1-T3 in FIG. 3) until the finger slide operation is performed, a partial image (face image in the frame 105a) specified by specification of the first point, a partial image group (which will be referred to as a transition image) sequentially obtained by cropping shooting, and a partial image (face image in the frame 105b) specified by specification of the second point. The image recorded in the recording unit 108 between timing T4 and timing T8 will resemble an image obtained by panning the camera 100 in the direction toward the frame 105b (direction in which the finger slide operation is performed) from the position of the frame 105a. Unlike usual panning, the camera 100 does not move even while such images are acquired. It is therefore possible to generate moving images with a smooth panning effect, compared to the usual panning.

Figure 4:
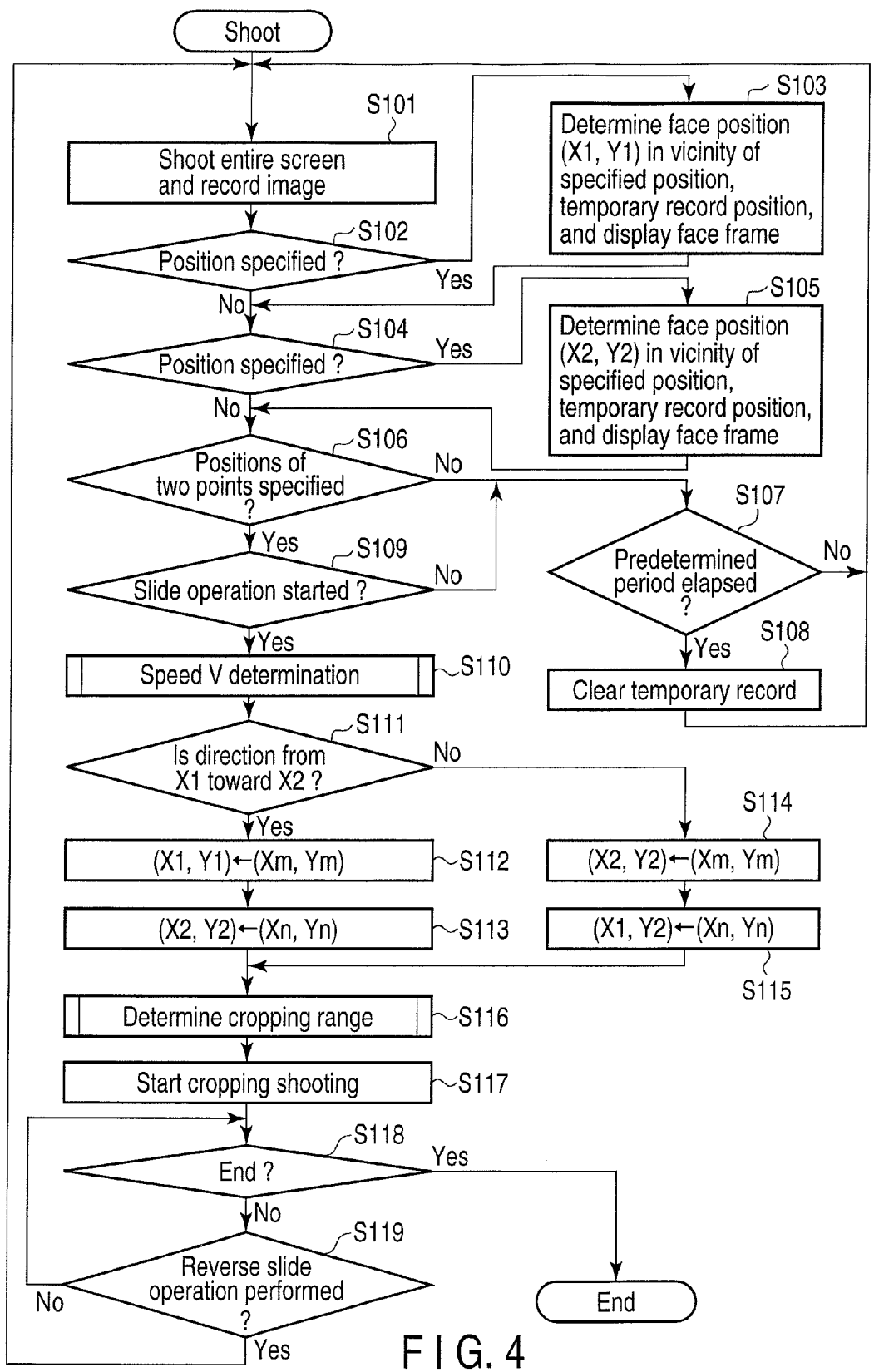
FIG. 4 is a flowchart illustrating a flow of the moving image generation method by a camera according to the first embodiment of the present invention.

FIG. 4 is a flowchart illustrating the flow of a moving image generation method by the camera 100 according to the first embodiment of the present invention. The operation of FIG. 4 is started at the point in time when execution of moving image shooting is instructed by the user, that is, when the release button is pressed by the user during the moving image shooting mode, for example.

When moving image shooting is started, the control unit 101 causes the imaging unit 102 to start operation. After performing image processing on the entire shot image acquired by the imaging unit 102, the control unit 101 causes the recording unit 108 to record the image obtained by the image processing (step S101). Further, the control unit 101 causes the clock unit 109 to start timing upon start of the moving image shooting.

After recording the shot image, the control unit 101 determines whether position specification has been made on the display screen of the image display unit 105 by the user, based on the output from the region specification unit 106 (step S102). When the position specification has been made in the determination in step S102, the control unit 101 detects a face image in the vicinity of the position specified by the user, using the face detection unit 103. Further, the control unit 101 determines the central position (X1, Y1) and the size of the face image detected by the face detection unit 103. Further, assume that the central position (X1, Y1) is the central position when the face image is regarded as a circle, for example. Assume that the position (X1, Y1) is a relative position when the point at the upper left end of the display screen of the image display unit 105, for example, is (0, 0). Further, assume that the size is a diameter when the face image is regarded as a circle. After calculating the central position (X1, Y1) and the size, the control unit 101 sets the size of the cropping range according to the size of the face image. The size of the cropping range is calculated such that it is greater than the size of the face image and the aspect ratio becomes equal to the aspect ratio of the display screen of the image display unit 105, for example. After calculating the central position and the cropping range, the control unit 101 causes the temporary recording unit 2041 to record the central position (X1, Y1) and the size (length D1 of the longer side, for example) of the cropping range. Further, the control unit 101 causes the display image unit 105 to display a rectangular frame 105a indicating the cropping range in the position (X1, Y1) of the image display unit 105 (step S103).

Next, the control unit 101 determines whether position specification has been made on the display screen of the image display unit 105 by the user, based on the output from the region specification unit 106 (step S104). When the position specification has been made in the determination of step S104, the control unit 101 detects a face image in the vicinity of the position specified by the user using the face detection unit 103. Further, the control unit 101 determines the central position (X2, Y2) and the size of the face image detected by the face detection unit 103. After calculating the central position and the cropping range, the control unit 101 causes the temporary recording unit 2041 to record the central position (X2, Y2) and the size (length D2 of the longer side, for example) of the cropping range. Further, the control unit 101 causes the image display unit 105 to display a rectangular frame 105b indicating the cropping range in the position (X2, Y2) on the display screen (step S105).

Next, the control unit 101 determines whether the positions of the two points have already been specified (step S106). When the positions of the two steps have not yet been specified in the determination of step S106, the control unit 101 determines whether a predetermined period (approximately 3 seconds) has elapsed or not, based on the timing result of the clock unit 109 (step S107). When the predetermined period has elapsed in the determination of step S107, the control unit 101 clears the recording content of the temporary recording unit 2041 (step S108). After that, the process returns to step S101, and the control unit 101 continues moving image shooting of the entire screen. When the predetermined period has not elapsed in the determination of step S107, on the other hand, the procedure returns to step S101 by skipping the process of step S108.

Further, when the positions of the two points have already been specified in the determination of step S106, the control unit 101 determines whether a finger slide operation has been started by the user or not (step S109). Whether the finger slide operation has been started or not is determined by determining whether a contact of a finger of a user, for example, has been made on the display screen of the image display unit 105, in the state in which the two points have been specified. That is, when a contact of a finger of the user, for example, has been detected, it is determined that a finger slide operation has been started. When a finger slide operation has not been started in the determination of step S109, the procedure shifts to step S107. When a finger slide operation has been started in the determination of step S109, on the other hand, the control unit 101 performs a speed V determination process of determining a finger slide speed V (step S110).

A description will be made with regard to the speed V, with reference to FIG. 5. When a contact of a finger of the user, for example, has been made on the display screen of the image display unit 105 in the state in which the two points have been specified in the speed V determination process, the control unit 101 determines that the contact position, which will be referred to as P1, is the start position of the finger slide operation (step S201). When the finger slide operation is only in the X-direction, only the X-coordinate of P1 needs to be determined. After that, the control unit 101 determines whether a predetermined period $\Delta t$ (approximately 0.5 seconds) has elapsed or not (step S202). When the predetermined period $\Delta t$ has not elapsed in the determination of step S202, the control unit 101 switches into a standby state, while performing the determination of step S202.

Further, when the predetermined period $\Delta t$ has elapsed in the determination of step S202, the control unit 101 determines that the contact position at that point in time, which will be referred to as P2, is the end position of the finger slide operation (step S203). Further, the finger slide speed V is calculated from the position of P1, the position of P2, and $\Delta t$, according to the following formula (step S204):

$$V=(P2-P1)/\Delta t \quad \text{(Formula 1)}$$

In this formula, the reference mark V indicates the finger slide direction.

Referring back to FIG. 4, a description will be further made. After performing the speed V determination process, the control unit 101 determines whether the finger slide direction is the direction (A direction in the example of FIG. 2C) from X1 toward X2 or not (step S111). When the finger slide direction is from X1 toward X2 in the determination of step S111, the control unit 101 sets the parameter (Xm, Ym) indicating the cutout start point of the partial image in cropping shooting to (X1, Y1) (step S112). Further, the control unit 101 sets the cutout end point of the partial image of cropping shooting to (X2, Y2) (step S113). Further, when the finger slide direction in the determination of step S111 is from X2 toward X1, the control unit 101 sets the parameter (Xm, Ym) indicating the cutout position of the partial image in cropping shooting to (X2, Y2) (step S114). Further, the control unit 101 sets the parameter (Xn, Yn) indicating the cutout end position of the partial image in the cropping shooting to (X1, Y1) (step S115).

It is to be noted that the procedure from step S111 to step S115 is a procedure based on the assumption that the trail of the finger slide operation is a straight line extending along the X-direction. In reality, the finger slide operation is considered to be made in an arbitrary direction in parallel to the display screen of the image display unit 105. The procedure of the case when the finger slide operation is set to be arbitrary will be described later, with reference to the third embodiment.

After setting a parameter indicating the cutout start point and a cutout end point of the partial image, the control unit 101 performs a cropping range determination process of determining the cutout range of the partial image as a cropping range (step S116).

Figure 6:
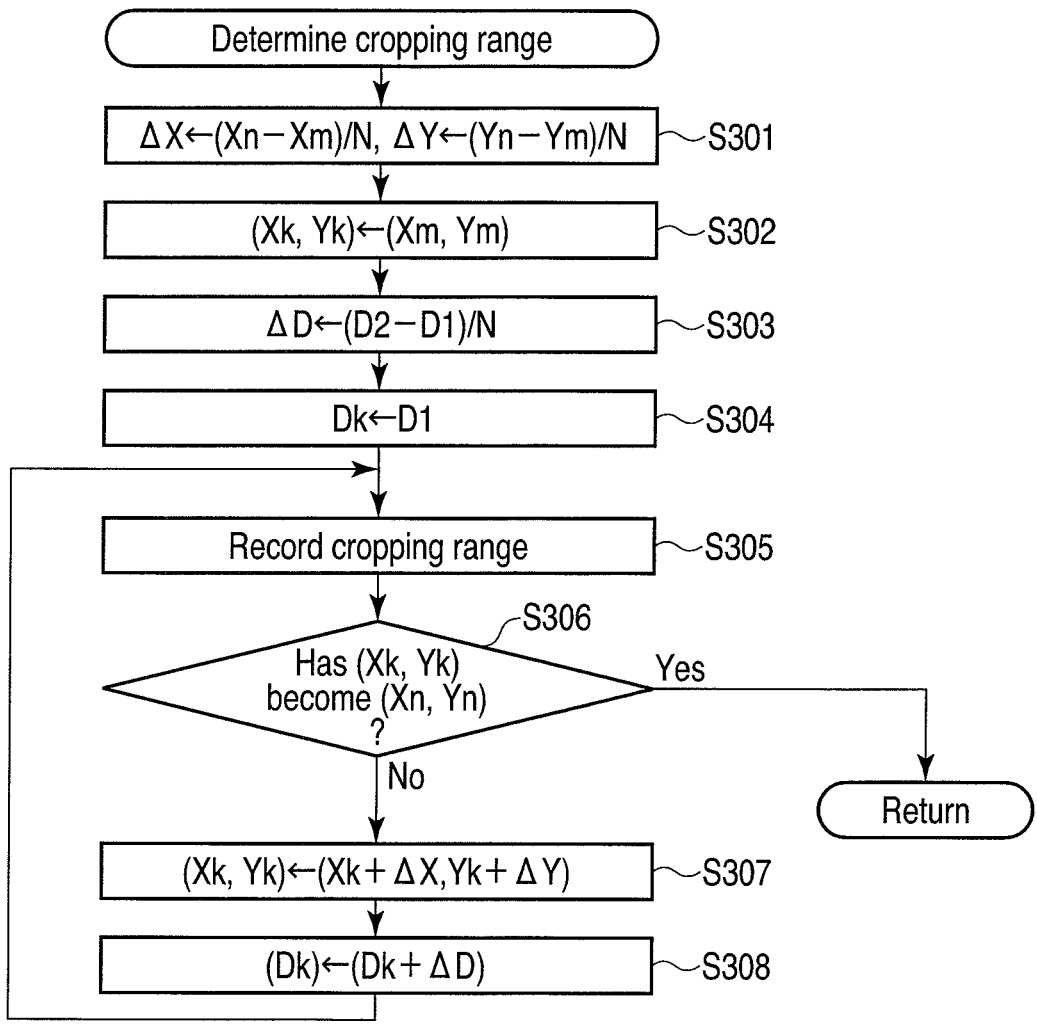
FIG. 6 is a flowchart illustrating a cropping range determination process.

The cropping range determination process will be described with reference to FIG. 6. In FIG. 6, the control unit 101 determines the parameters $\Delta X$, $\Delta Y$ designed to determine the increment of the cutout position according to the following formula (step S301):

$$\Delta X=(Xn-Xm)/N$$

$$\Delta Y=(Yn-Ym)/N \quad \text{(Formula 2)}$$

The reference mark N indicates a value equivalent to a resolution of the cutout position, and may be varied according to the distance between the two points specified by the user, or the frame rate of the imaging unit 102. Further, N may be a fixed value. In this case, N is set as 10 for the sake of simplicity.

After determining $\Delta X$, $\Delta Y$, the control unit 101 sets the initial position (Xm, Ym) in a register, for example, configured to set the parameter (Xk, Yk) indicating the cutout position of the partial image (step S302).

The control unit 101 determines the parameter $\Delta D$ designed to determine the increment of the cropping range according to the following formula (step S303):

$$\Delta D=(D2-D1)/N \quad \text{(Formula 3)}$$

The same value as that of N in (Formula 2) will be used as N. After determining $\Delta D$, the control unit 101 sets the initial value D1 as the parameter Dk indicating the length of the longer side of the cropping frame (step S304).

The control unit 101 causes the temporary recording unit 2041 to record the rectangular range in which the central position is (Xk, Yk) and the length of the longer side is Dk, as the cropping range (step S305). The control unit 101 determines whether the set (Xk, Yk) has become (Xn, Yn) (step S306).

When it is determined in the determination of step S306 that (Xk, Yk) has not become (Xn, Yn), the control unit 101 sets (Xk+$\Delta X$, Yk+$\Delta Y$) as new (Xk, Yk) (step S307). Further, the control unit 101 sets (Dk+$\Delta D$) as new (Dk) (step S308). After that, the procedure returns to step S305. When the position (Xk, Yk) has become (Xn, Yn) in the determination of step S306, the control unit 101 ends the procedure of FIG. 6. Thus, information on an N number of cropping ranges is recorded in the temporary recording unit 2041.

FIG. 7A illustrates an example of the cropping range determined in the cropping range determination process. As a result of the cropping range determination process, the cropping range corresponding to the frame 105a becomes a rectangular region having (X1, Y1) as the central position and a length D1 as the longer side, as shown in FIG. 7A. Further, the cropping range corresponding to the frame 105b becomes a rectangular region having (X2, Y2) as the central position and a length D2 as the longer side. Further, the position and size of the cropping range between the two points of the frame 105a and the frame 105b can be obtained by performing linear interpolation using the positions and sizes of the frame 105a and the frame 105b. That is, the cropping range between the two points of the frame 105a and the frame 105b becomes a rectangular region in which the length of the longer side varies by ΔD, as the central position deviates from the original position by ΔX in the X-direction and by ΔY in the Y-direction.

In the process shown in FIG. 6, the length of the longer side of the cropping range is increased by ΔD from D1 to D2. However, the size of the cropping range may be set before the finger slide operation, as shown in FIG. 7B. For example, the size of the cropping range corresponding to the frame 1051a and the size of the cropping range corresponding to the frame 1051b may be determined according to the enlargement ratio between the frame 1051a after enlargement and the frame 105a before enlargement, when an operation of moving the finger 301 so as to enlarge one (frame 105a in FIG. 7B) of the frame 105a and the frame 105b displayed on the display screen of the image display unit 105, for example, has been detected. In that case, D1 is the length of the longer side of the frame 1051a after enlargement, and D2 is obtained by multiplying the ratio between the length of the longer side of the frame 105a before enlargement and the length of the longer side of the frame 1051a after enlargement by the length of the longer side of the frame 105b before enlargement, for example.

Referring back to FIG. 4, a further description will be made. After determining the cropping range of each of the partial images, the control unit 101 instructs start of cropping shooting (step S117). In the cropping shooting, the position and size of the cropping range is sequentially varied to the position and size of the cropping range determined by the cropping range determination process every predetermined period Δt, and the partial image pertaining to the cropping range is cut out from the image obtained by the imaging unit 102 and the recording unit 108 is caused to record the cutout image. In this case, the predetermined period Δt is determined by the finger slide speed V. For example, Δt is determined by the following formula:

$$\Delta t = (X2 - X1)/V \quad \text{(Formula 4)}$$

After start of the cropping shooting, the control unit 101 determines whether ending of the moving image shooting has been instructed or not by the user operation (step S118). A release button push operation, for example, is a possible ending instruction for the moving image shooting. When ending of the moving image shooting has been instructed in the determination of step S118, the control unit 101 ends the procedure of FIG. 4. When ending of the moving image shooting has not been instructed in the determination of step S118, the control unit 101 determines whether a reverse slide operation has been performed by the user or not (step S119). The reverse slide operation is a finger slide operation in a direction opposite to the finger slide operation in step S109. When the reverse slide operation has not been performed in the determination of step S119, the procedure returns to step S118, and the control unit 101 determines again whether an ending instruction of the moving image shooting has been made or not. When the reverse slide operation has been performed in the determination of step S119, on the other hand, the procedure returns to step S101. Thereby, the state in which only a portion of the image obtained by the imaging unit 102 in the cropping shooting reverts to the state in which the entire image obtained by the imaging unit 102 is recorded.

As described above, according to the first embodiment, it is possible to generate moving images having an effect similar to that obtained by panning, through a simple operation of moving a finger, for example, on the display screen of the image display unit 105, without panning the camera 100 itself. Moreover, since the camera 100 itself does not need to be panned, a smooth panning effect can be obtained.

It is to be noted that, in the first embodiment, since the camera 100 itself is not panned, cropping shooting can be performed only within the range of image acquired by the imaging unit 102 during cropping shooting. Accordingly, a mode for cropping shooting may be set in advance as one of modes for moving image shooting, such that an image with a wider angle than the normal moving image shooting mode may be acquired when the moving image shooting mode for cropping shooting is set. Such a procedure can be embodied by providing a zoom lens in the imaging unit 102 and driving the zoom lens toward the wide-angle side.

Second Embodiment

Next, the second embodiment of the present invention will be described. In the first embodiment, cropping shooting is not performed, until a point is specified and then a finger slide operation is performed. It is therefore difficult to capture the expression of the subject from the point in time when the point is specified to when a finger slide operation is performed through cropping shooting. In the second embodiment, the expression of the subject from the point in time when the point is specified is configured to be captured in the cropping shooting. Since the configuration of the camera 100 is the same as that described in the first embodiment, a detailed configuration thereof will be omitted.

Figure 8:
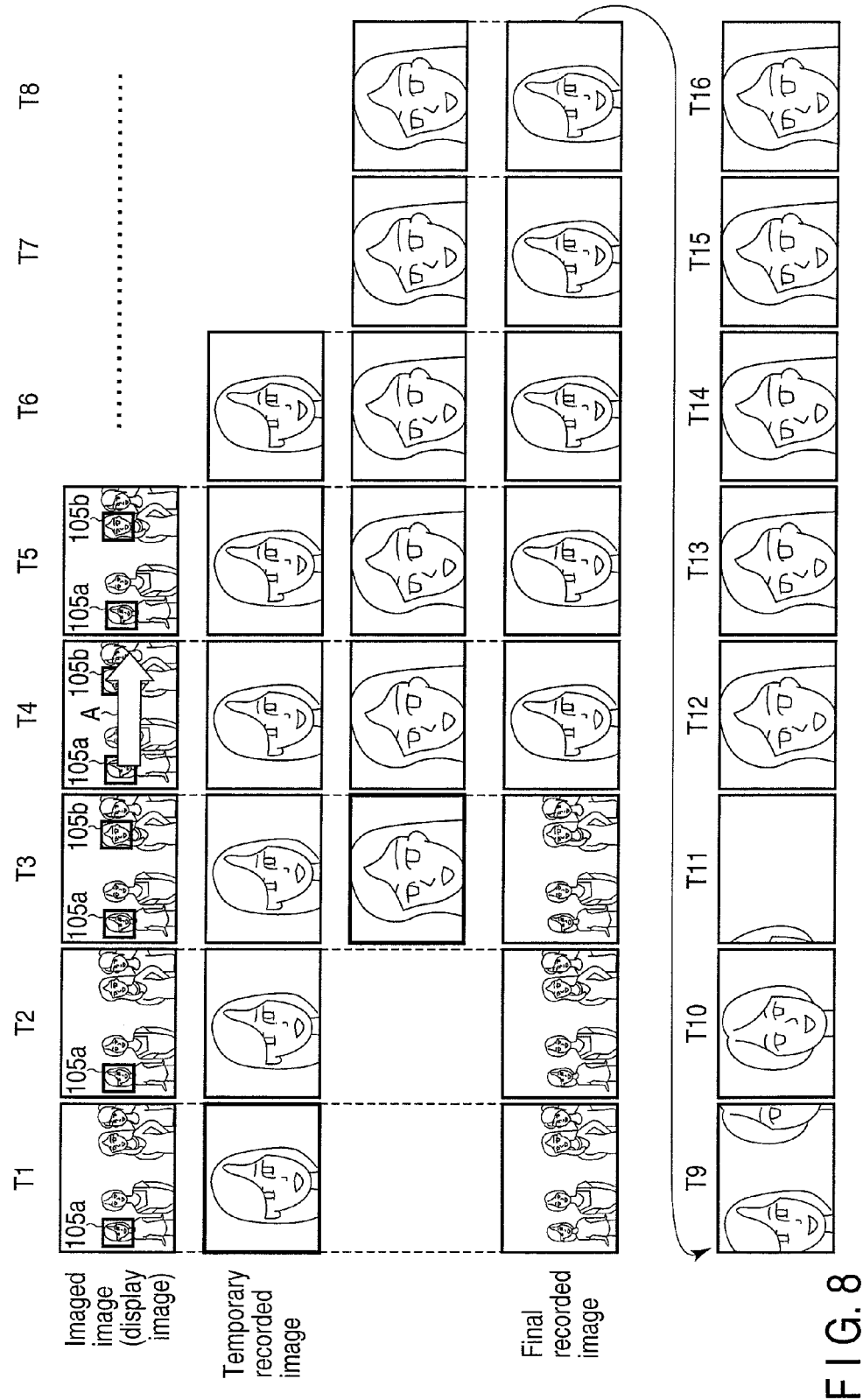
FIG. 8 illustrates the relationship between a shot image obtained by the imaging unit and an image actually recorded in the recording unit according to a second embodiment of the present invention.

FIG. 8 illustrates the relationship between the shot image obtained by the imaging unit 102 and the image actually recorded in the recording unit 108. In the example of FIG. 8, the first point is specified in timing T1, when the moving image shooting is started. A face image (face image in the frame 105a) in the vicinity of the point specified by that point in time is recorded in the temporary recording unit 2041. Hereinafter, a face image in the frame 105a is recorded in the temporary recording unit 2041 until a finger slide operation is performed.

After that, in the example of FIG. 8, the second point is specified in timing T3. A face image (a face image in the frame 105b) in the vicinity of the point specified at that point in time is also recorded in the temporary recording unit 2041. After that, the face image in the frame 105b is also recorded in the temporary recording unit 2041 until a finger slide operation is performed.

Cropping shooting is started from timing T4, when a finger slide operation is performed. This cropping shooting is the same as that of the first embodiment. However, the final moving image recorded in the recording unit 108 is an image obtained by combining an entire image obtained by the imaging unit 102 in the timings (timings T1-T3 in FIG. 8) until a finger slide operation is performed, a partial image (face image in the frame 105a) specified and sequentially obtained in the timing (timing T1 in FIG. 8) in which the first point is specified, a partial image group (transitional image) sequentially obtained in the timing in which the finger slide operation is performed, and a partial image (face image in the frame 105b) specified and sequentially obtained in the timing (timing T3 in FIG. 8) in which the second point is specified.

Figure 9:
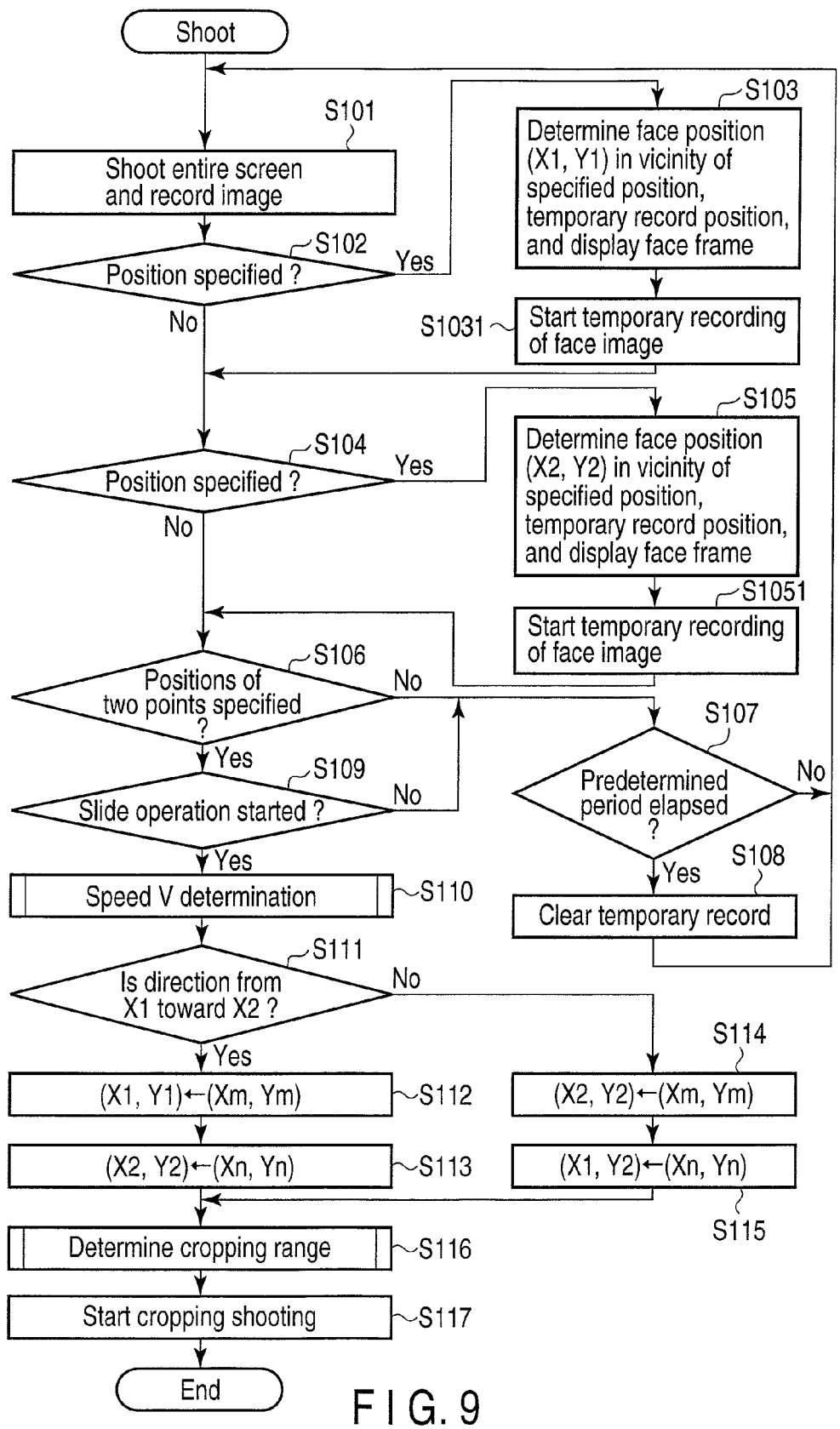
FIG. 9 is a flowchart illustrating a flow of the moving image generation method by a camera according to the second embodiment of the present invention.

FIG. 9 is a flowchart illustrating a moving image generation method by the camera 100 according to the second embodiment of the present invention. FIG. 9 is approximately the same as FIG. 4. Accordingly, steps the same as those of FIG. 4 will be denoted by the same step numbers and detailed descriptions thereof will be omitted in FIG. 9. That is, FIG. 9 is different from FIG. 4 in that step S1031, in which a face image of a position detected in step S103 is recorded in the temporary recording unit 2041, and step S1051, in which the face image of the position detected in step S105 is recorded in the temporary recording unit 2041, are added.

FIG. 10 is a flowchart illustrating the flow of a moving image generation method according to the approach of the second embodiment. When a moving image recorded as shown in FIG. 8 is played back, the control unit 101 performs an expansion process by reading the moving image from the recording unit 108. Further, the control unit 101 causes the image display unit 105 to the sequentially display the expanded moving images. In this step, the control unit 101 causes the image display unit 105 to display the entire image corresponding to timing T1 on the display screen (step S501). After displaying the entire image, the control unit 101 determines whether an image to be displayed next is a face image corresponding to the position of the first point (step S502). If the image to be displayed next is not the face image corresponding to the position of the first point in the determination of step S502, the procedure shifts to step S512.

Further, when the image to be displayed next is the face image corresponding to the position of the first point in the determination of step S502, the control unit 101 causes the image display unit 105 to display the face image corresponding to the position of the first point on the display screen (step S503). After that, the control unit 101 determines whether an amount of variation in expression of the face image to be displayed next is great or not, with respect to the expression of the face image currently being displayed, in the face image corresponding to the position of the first point (step S504). It is to be noted that the amount of variation in expression refers to a sum amount of variation in pixel data of each of the face parts, such as an eye, a nose, and a mouth, with respect to the previous face image. When the amount of variation in expression of the next face image is greater than the previously displayed face image in the determination of step S504, the procedure returns to step S503, and the control unit 101 causes the image display unit 105 to display the next face image on the display screen. When the amount of variation in expression of the next face image is smaller than the previously displayed face image in the determination of step S504, display of the face image corresponding to the position of the first point is ended. In that case, the procedure shifts to step S505. That is, assuming that an expression 1 in the vertical axis of FIG. 11 is time variation of the amount of variation in expression corresponding to the position of the first point, the control unit 101 causes the image display unit 105 to display only the face image obtained in a period Tf1, when the amount of variation of the expression 1 is large, in the face image obtained from a timing Tp1, when the first point has been specified.

After ending display of the face image corresponding to the position of the first point, the control unit 101 determines whether a face image having a large amount of variation in expression exists in a face image corresponding to the position of a second point obtained in the timing before the finger slide operation is performed (step S505). When a face image having a large amount of variation in expression exists in the face image corresponding to the position of the second point obtained in the timing before the finger sliding, the control unit 101 causes the image display unit 105 to sequentially display a transitional image on the display screen (step S506), and then causes the image display unit 105 to display a face image having a great amount of variation in expression in the face image corresponding to the position of the second point obtained in the timing before the finger sliding on the display screen (step S507). After that, the control unit 101 determines whether the amount of variation in expression of the face image to be displayed next is greater than the expression of the face image currently being displayed or not, in the face image corresponding to the position of the second point obtained in the timing before the finger sliding (step S508). When the amount of variation in expression of the next face image is greater than the previously displayed face image in the determination of step S508, the procedure returns to step S507. In this case, the control unit 101 causes the image display unit 105 to display the next face image on the display screen of the image display unit 105. When the amount of variation in expression of the next face image is smaller than the previously displayed face image, display of the face image corresponding to the position of the second point is ended. In that case, the procedure shifts to step S512. That is, assuming that an expression 2 in the vertical axis of FIG. 11 is time variation of the amount of variation in expression corresponding to the position of the second point, the control unit 101 causes the image display unit 105 to display only the face image obtained in a period Tf2, when the amount of variation of the expression 2 is large, from face images obtained between a timing Tp2, when the second point has been specified, and a timing Ts, when the finger slide operation has been performed.

Further, when a face image having a large amount of variation in expression does not exist in the face image corresponding to the position of the second point obtained in the timing before the finger sliding, the control unit 101 causes the image display unit 105 to sequentially display a transitional image on the display screen (step S509), and then causes the image display unit 105 to display a face image having a large amount of variation in expression from the face images corresponding to the position of the second point obtained in the timing after the finger sliding, on the display screen (step S510). After that, the control unit 101 determines whether the face image to be displayed next is greater than the expression of the face image currently being displayed, from among the face images corresponding to the position of the second point obtained in the timing after the finger sliding (step S511). If the amount of variation in expression of the next face image is great, with respect to the previously displayed face image in the determination of step S511, the procedure returns to step S510. In this case, the control unit 101 causes the image display unit 105 to display the next face image on the display screen. When the amount of variation in expression of the next face image is small, with respect to the previously displayed face image, display of the face image corresponding to the position of the second point is ended. In that case, the procedure shifts to step S512. That is, assuming that the expression 2 is time variation of the amount of variation in expression corresponding to the position of the second point, the control unit 101 displays only the face image obtained in the period in which the amount of variation of the expression 2 is great, from among the face images obtained in and after timing Ts, in which the finger slide operation has been performed.

When the image to be displayed next in the determination of step S502 is not the face image corresponding to the position of the first point, or after steps S508, S511, the control unit 101 determines whether to end playback of the moving image (step S512). If playback of the moving image is continued in the determination of step S512, the procedure returns to step S501. When playback of the moving image is ended in the determination of step S512, on the other hand, the control unit 101 ends the procedure shown in FIG. 10.

As described above, according to the second embodiment, it is similarly possible to generate a moving image having an effect similar to that obtained by panning, through a simple operation of moving a finger, for example, on the display screen of the image display unit 105, without panning the camera 100 itself. Further, since the camera 100 itself does not need to be panned, a smooth panning effect can be obtained.

Further, according to the second embodiment, the expression of the subject from the specification of the point to the finger slide operation can be obtained as a partial image. Further, during playback, the face image corresponding to the position of the first point and the face image corresponding to the position of the second point are displayed only when they have a large amount of variation in expression. Accordingly, it is possible to reduce the possibility that only similar images are displayed.

In the second embodiment, the partial image (face image) corresponding to the position of the first point and the partial image (face image) corresponding to the position of the second point are combined and recorded. Accordingly, it is difficult to record an audio, as well as a moving image, by precisely synchronizing the moving image and the audio. Accordingly, in the second embodiment, audio recording does not need to be performed. Alternatively, a moving image and an audio may be synchronized by fast-forwarding the audio during playback.

Third Embodiment

Next, the third embodiment of the present invention will be described. In the above-described first and second embodiments, the cropping range is determined from the positions of two points specified by the user, and the partial images are sequentially cut out. In the third embodiment, on the other hand, the cropping range is determined from positions of 3 or more points specified by the user, and the partial images are sequentially cut out. Since the configuration of the camera 100 is the same as that described in the first embodiment, a detailed description will be omitted.

Hereinafter, the operation of the camera 100 as an example of a moving image generation apparatus according to the third embodiment of the present invention will be described.

Figure 12A:
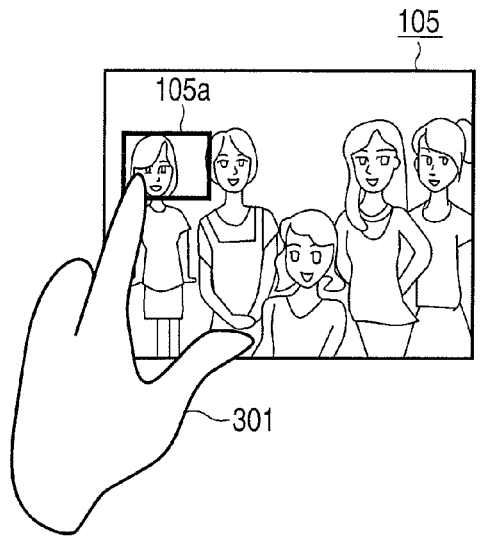
FIGS. 12A, 12B, 12C, and 12D illustrate an outline of a moving image generation operation according to a third embodiment of the present invention.

When moving image shooting by the camera 100 is started, continuous imaging is performed by an imaging unit 102, as in the first embodiment, and the moving image obtained by the continuous imaging is displayed on an image display unit 105 and recorded in a recording unit 108. When a finger 301 of the user contacts an arbitrary point on the display screen of the image display unit 105, a face image in the vicinity of that point is detected by a face detection unit 103. When a face is detected by the face detection unit 103, the position of the face image is recorded in a temporary recording unit 2041. In the meantime, continuous imaging by the imaging unit 102 is continued, and a frame 105a surrounding the face image, as shown in FIG. 12A, is superimposed on the moving image displayed on the image display unit 105 according to the continuous imaging.

Figure 12B:
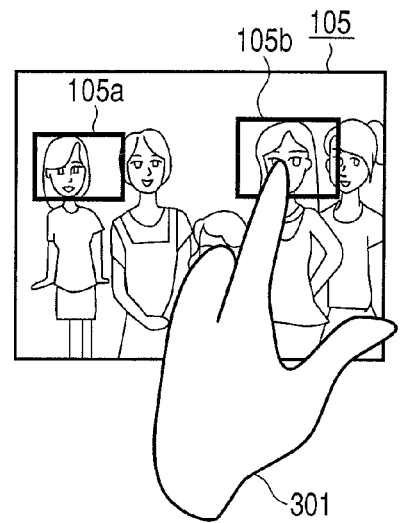

After that, when the finger 301 of the user contacts another point on the display screen of the image display unit 105, a face image in the vicinity of that point is detected by the face detection unit 103. When the face is detected by the face detection unit 103, the position of the face image is recorded in the temporary recording unit 2041. In the meantime, continuous imaging by the imaging unit 102 is continued, and a frame 105b surrounding the face image, as shown in FIG. 12B, is superimposed on the moving image displayed on the image display unit 105 according to the continuous imaging.

Figure 12C:
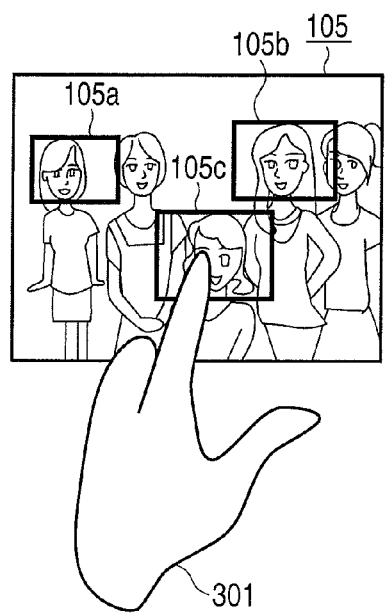

After that, when the finger 301 of the user contacts another point on the display screen of the image display unit 105, a face image in the vicinity of that point is detected by the face detection unit 103. When the face is detected by the face detection unit 103, the position of the face image is recorded in the temporary recording unit 2041. In the meantime, continuous imaging by the imaging unit 102 is continued, and a frame 105c surrounding the face image, as shown in FIG. 12C, is superimposed on the moving image displayed on the image display unit 105 according to the continuous imaging.

Figure 12D:
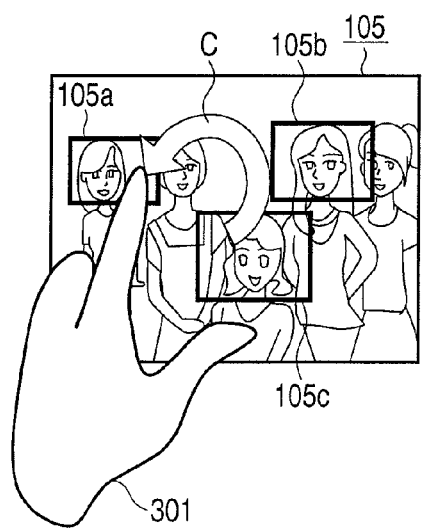
Figure 13:
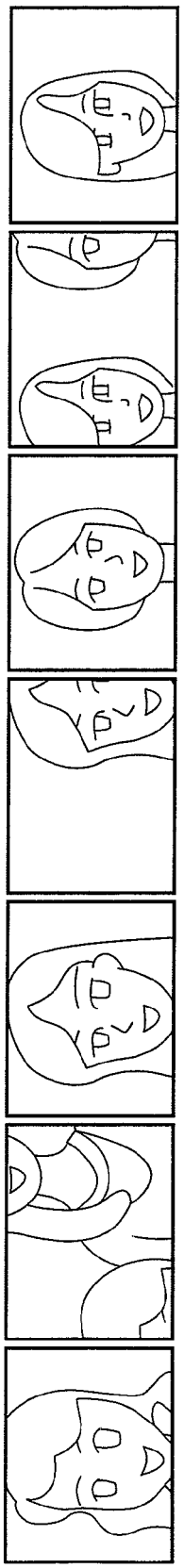
FIG. 13 illustrates the configuration of a transition image obtained according to the third embodiment of the present invention.

After that, the user slides the finger 301 in an arbitrary direction C on the display screen, as shown in FIG. 12D. Thereby, cropping shooting is performed, and a transitional image including a partial image corresponding to the position of the frame 105a, a partial image corresponding to the position of the frame 105b, and a partial image corresponding to the position of a frame 105c are obtained, as shown in FIG. 13.

Figure 14:
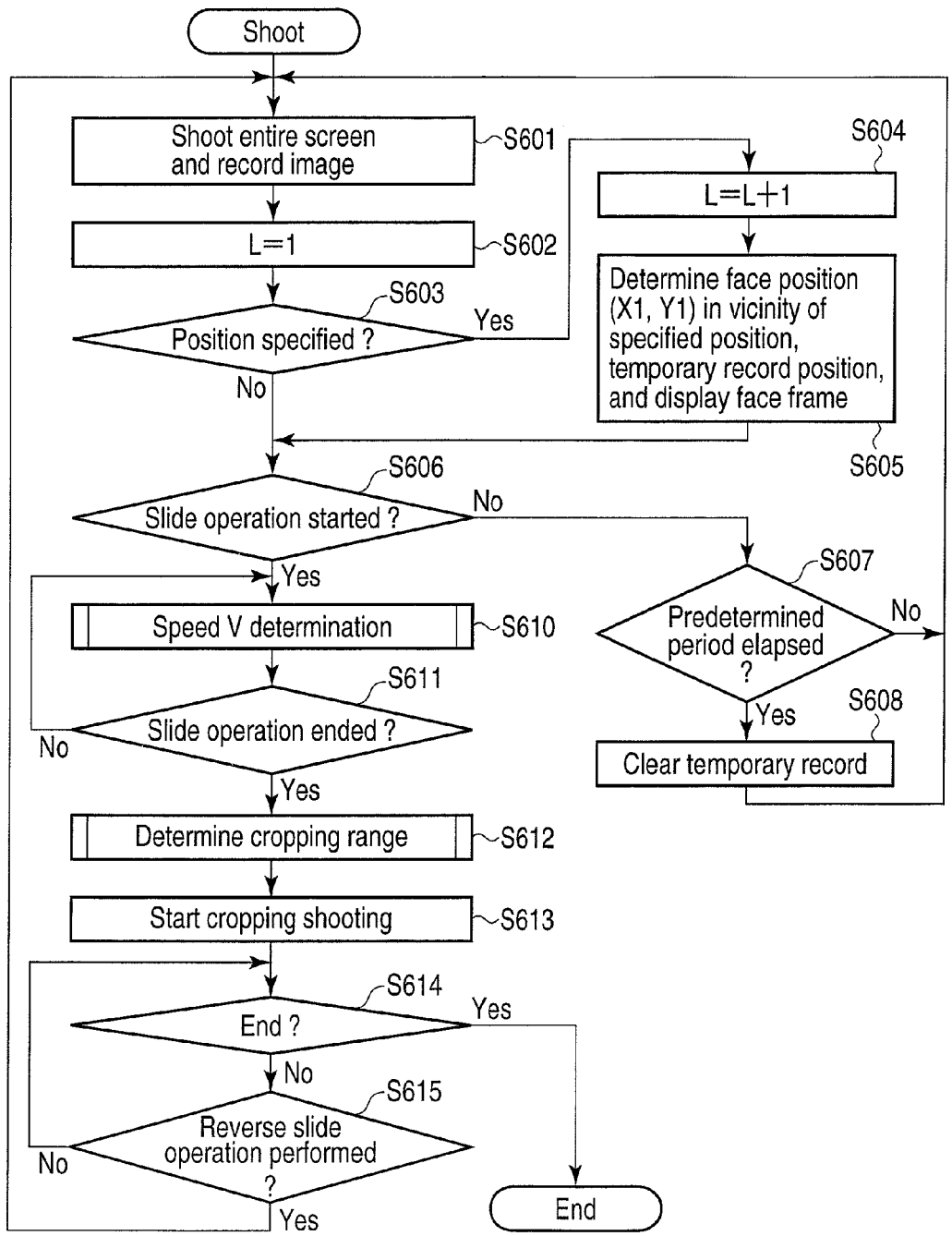
FIG. 14 is a flowchart illustrating the flow of a moving image generation method by the camera according to the third embodiment of the present invention.

FIG. 14 is a flowchart illustrating the flow of a moving image generation method by the camera 100 according to the third embodiment of the present invention.

When moving image shooting is started, the control unit 101 starts operating the imaging unit 102. After performing an image processing operation on the entire shot image acquired by the imaging unit 102, the control unit 101 causes the recording unit 108 to record the image obtained by the image processing operation (step S601). Further, the control unit 101 causes the clock unit 109 to start timing upon start of the movie image shooting.

After recording the shot image, the control unit 101 sets a parameter L indicating the number of times of point specification to 1 (step S602). After that, the control unit 101 determines whether position specification has been made on the display screen of the image display unit 105 by the user, based on the output from a region specification unit 106 (step S603). When the position specification has been made in the determination of step S603, the control unit 101 increments L by 1 (step S604), and then detects a face image in the vicinity of the position specified by the user using the face detection unit 103. Further, the control unit 101 determines a central position (Xn, Yn) and a size of the face image detected by the face detection unit 103. After that, the control unit 101 causes the temporary recording unit 2041 to record the central position (Xn, Yn) and the size (length Dn of the longer side, for example) of the cropping range. Further, the control unit 101 causes the image display unit 150 to display a rectangular frame indicating the cropping range in the position (Xn, Yn) on the display screen of the image display unit 105 (step S605).

After that, the control unit 101 determines whether a finger slide operation has been started, based on the output of the region specification unit 106 (step 606). It is to be noted that the determination as to whether the finger slide operation has been started or not is performed by determining whether the contact position of a finger of the user, for example, on the display screen of the image display unit 105 has continually varied or not. When a finger slide operation has not been started in the determination of step S606, the control unit 101 determines whether a predetermined period (approximately 3 seconds) has elapsed or not, based on the timing result of the clock unit 109 (step S607). When a predetermined period has elapsed in the determination of step S607, the control unit 101 clears the recorded content of the temporary recording unit 2041 (step S608). After that, the procedure returns to step S601, and the control unit 101 continues the moving image shooting of all the screens. When the predetermined period has not elapsed in the determination of step S607, on the other hand, the procedure of step S608 is skipped and the procedure reverts to step S601. That is, in the third embodiment, it is possible to specify positions of 3 or more points until the predetermined period elapses.

When a finger slide operation has been started in the determination of step S608, the control unit 101 performs a speed V determination process for determining the finger slide speed V (step S610). Since the speed V determination process is the same procedure as that described with reference to FIG. 5, a detailed description will be omitted. After determining the finger slide speed V (direction and speed), the control unit 101 determines whether a finger slide operation has been ended by the user (step S611). It is to be noted that the determination as to whether the finger slide operation has been ended or not is performed by determining whether the contact of a finger of the user, for example, on the display screen of the image display unit 105 has been released or not. In the determination of step S611, when the finger slide operation has not been ended, the procedure reverts to step S610, and the control unit 101 performs determination of the finger slide speed V again. That is, in the third embodiment, determination of the finger slide speed V per unit time of Δt second is performed until the finger slide operation of the user is released. With this configuration, it is possible to determine the trail (amount of variation in position) of the finger slide operation other than a straight line.

When the finger slide operation has been ended in the determination of step S611, the control unit 101 performs a cropping range determination process (step S612). The basic flow of the cropping range determination process is the same as the flow shown in FIG. 6. However, the difference is that both of the parameters ΔT and ΔY for determining the increment of the cutout position are increased or decreased, and that a cropping range determination process is performed such that all the specification points recorded in the temporary recording unit 2041 in step S605 are passed through. For example, as shown in FIG. 12A, when three points in the frames 105a-105c are specified, a cropping range determination process between the two points in the frame 105a and the frame 105b and a cropping range determination process between the two points of the frame 105b and the frame 105c are performed.

After determining a cropping range of each of the partial images, the control unit 101 starts cropping shooting (step S613). This cropping shooting is performed in the same way as that described in the first embodiment. After starting the cropping shooting, the control unit 101 determines whether ending of the moving image shooting has been instructed by the user operation (step S614). When ending of the moving image shooting has been instructed in the determination of step S614, the control unit 101 ends the procedure of FIG. 14. When ending of the moving image shooting has not been instructed in the determination of step S614, on the other hand, the control unit 101 determines whether a reverse slide operation by the user has been performed or not (step S615). When the reverse slide operation has not been performed in the determination of step S615, the procedure returns to step S614, and the control unit 101 determines again whether an ending instruction of the moving image shooting has been performed again or not. When the reverse slide operation has been performed in the determination of step S615, the procedure returns to step S601. Thereby, the state in which only a portion of the image obtained by the imaging unit 102 in the cropping shooting is recorded reverts to the state in which the entire image obtained by the imaging unit 101 is recorded.

As described above, according to the third embodiments, it is possible to generate a moving image having an effect the same as that obtained by panning, even when the number of specification points is equal to or greater than three, or the trail of the finger slide is not linear. Moreover, since the camera 100 does not need to be panned, a smooth panning effect can be obtained.

Fourth Embodiment

Next, the fourth embodiment of the present invention will be described. In the above-described first to third embodiments, the user specifies a point on the display screen of the image display unit 105, and then cropping shooting is performed at the point in time when a finger slide operation is performed. In the fourth embodiment, on the other hand, cropping shooting is performed only by a finger slide operation. Since the configuration of a camera 100 is the same as that described in the first embodiment, a detailed description will be omitted.

Hereinafter, the operation of the camera 100 as an example of a moving image generation apparatus according to a fourth embodiment of the present invention will be described.

Figure 15A:
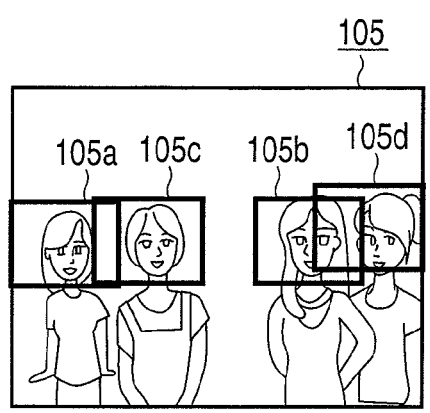
FIGS. 15A and 15B illustrate an outline of the operation of a moving image generation apparatus according to a fourth embodiment of the present invention.
Figure 15B:
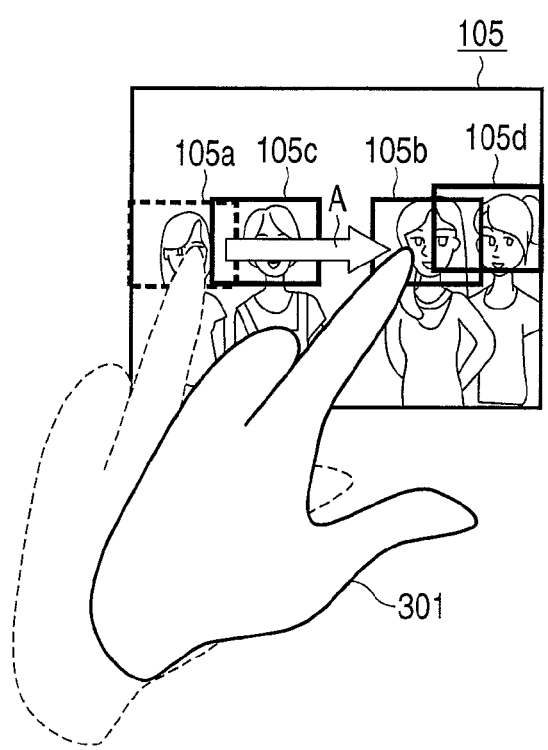

When moving image shooting is started by the camera 100, continuous imaging is performed by an imaging unit 102, and the moving image obtained by the continuous imaging is displayed on an image display unit 105 and recorded in the recording unit 108. In the fourth embodiment, face detection is performed by a face detection unit 103, as the moving image shooting is started. As a result of the face detection, as shown in FIG. 15A, frames 105a-105d, corresponding to the respective face images displayed on the display screen of the image display unit 105, are displayed. As shown by A direction in FIG. 15B, for example, the user slides a finger 301 so as to connect a plurality of points of the frames 105a-105d. Thereby, cropping shooting is performed, and a moving image having a panning effect as desired by the user is generated.

Figure 16:
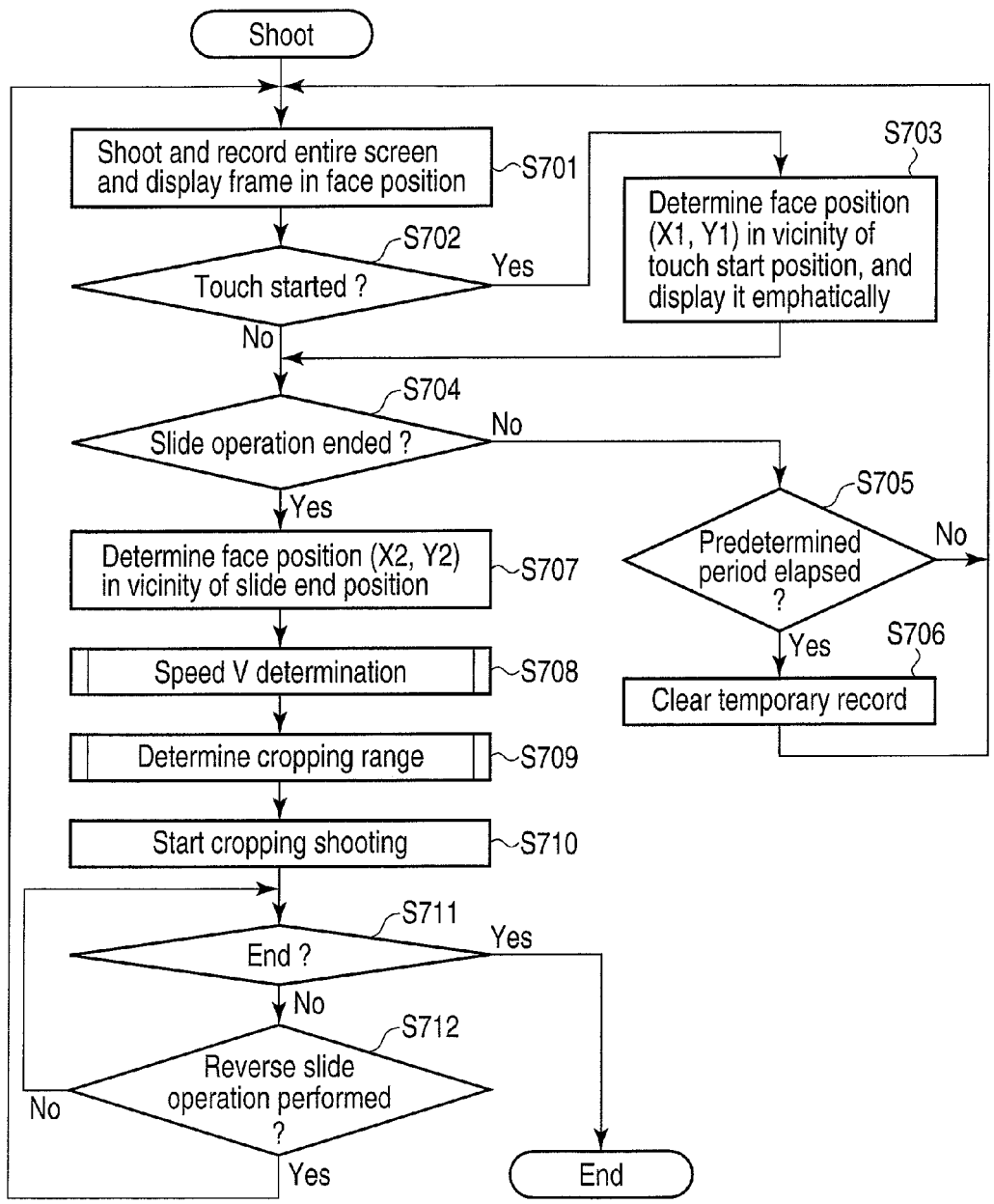
FIG. 16 is a flowchart illustrating the flow of a moving image generation method by a camera according to a fourth embodiment of the present invention.

FIG. 16 is a flowchart illustrating the flow of the moving image generation method of the camera 100 according to the fourth embodiment of the present invention. A case is assumed where two frames are connected by finger sliding.

When the moving image shooting is started, a control unit 101 starts operation of the imaging unit 102. Further, the control unit 101 performs image processing on the entire shot image acquired from the imaging unit 102, and then causes the recording unit 108 to record the image obtained by the image processing. The control unit 101 causes the face detection unit 103 to detect a face image in the shot image acquired by the imaging unit 102. Further, the control unit 101 causes the image display unit 105 to display a frame in each of the face images detected by the face detection unit 103 (step S701). Further, the control unit 101 causes the clock unit 109 to start timing as the moving image shooting is started.

After recording the shot image and displaying the frame, the control unit determines whether a finger of the user, for example, has contacted the display screen of the image display unit 105 (step S702). When the finger of the user, for example, has contacted the display screen of the image display unit in the determination of step S702, the control unit 101 determines a central position (X1, Y1) and a size D1 of a face image in the vicinity of the contact position of the finger of the user, for example, causes them to record in a temporary recording unit 2041, and causes the image display unit 105 to display the frame corresponding to the face image emphatically (step S703).

Next, the control unit 101 determines whether the finger slide operation by the user has ended or not, based on the output from the region specification unit 106 (step S704).

When the finger slide operation has not been ended in the determination of step S704, the control unit 101 determines whether a predetermined period (approximately 3 seconds) has elapsed or not, based on the timing result by a clock unit 109 (step S705). When a predetermined period has elapsed in the determination of step S705, the control unit 101 clears the recorded content in the temporary recording unit 2041 (step S706). After that, the procedure returns to step S701. If the predetermined period has not elapsed in the determination of step S705, the procedure returns to step S701, skipping the operation of step S706.

Further, when the finger slide operation has been ended in the determination of step S704, the control unit 101 determines a central position (X2, Y2) and a size D2 of a face image in the vicinity of the end position of the finger slide operation and causes the temporary recording unit 2041 to record them (step S707). After that, the control unit 101 performs a speed V determination process for determining a finger slide speed V (step S708). In the speed V determination process, a position P1 is the contact position detected in the determination of step S703, and a position P2 is the end position of the finger slide operation. Further, Δt is the period from when the contact of the finger of the user, for example, on the display screen of the image display unit 105 has been determined to when ending of the finger slide operation has been determined in step S704.

After determining the finger slide speed V, the control unit 101 performs a cropping range determination process (step S709). The cropping range determination process is the same process as that shown in FIG. 6. After determining the cropping range of each of the partial images, the control unit 101 instructs starting cropping shooting (step S710). The cropping shooting is performed in the same way as that described in the first embodiment. After starting the cropping shooting, the control unit 101 determines whether ending of the moving image shooting has been instructed by the user operation (step S711). When ending of the moving image shooting has been instructed in the determination of step S711, the control unit 101 ends the procedure of FIG. 16. When ending of the moving image shooting has not been instructed in the determination of step S711, the control unit 101 determines whether a reverse slide operation has been performed by the user or not (step S712). When the reverse slide operation has not been performed in the determination of step S712, the procedure returns to step S711, and the control unit 101 determines again whether an ending instruction of the moving image shooting has been performed or not. When a reverse slide operation has been performed in the determination of step S712, the procedure returns to step S701. Thereby, the state in which only a portion of the image obtained by the imaging unit 102 by the cropping shooting reverts to the state in which the entire image obtained by the imaging unit 102 is recorded.

As described above, according to the fourth embodiment, the same effect as that described in the first to third embodiments can be obtained, through one process of sliding a finger, instead of two steps of specifying a point and then sliding a finger.

In the above-described embodiments, a case has been described where the moving image generation apparatus is applied to a digital camera, but the moving image generation apparatus of the above-described embodiments is applicable to a variety of apparatuses capable of performing moving image shooting.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A moving image generation apparatus comprising:
   a touch sensitive image display unit configured to display a recorded still image and to receive user input;
   a partial image specification unit configured to specify partial images of a predetermined range in the recorded still image displayed on the touch sensitive image display unit corresponding to two points, separately touched by a user, in the recorded still image displayed on the touch sensitive image display unit, the partial image specification unit displaying frames indicating each of the two points specified in the recorded still image displayed on the touch sensitive image display unit;
   a partial image cutout unit configured to cut out a plurality of mutually-different partial images from between two partial images included in the partial images specified by the partial image specification unit, a cutout position of each of the plurality of partial images being based on touch positions of a slide operation on the touch sensitive image display unit by the user;
   an image processing unit configured to expand (1) each of the partial images, specified by the partial image specification unit, to a size of the recorded still image, and (2) each of the mutually-different partial images, cut out by the partial image cutout unit, to the size of the recorded still image, to thereby generate expanded partial images and expanded mutually-different partial images;
   a recording unit adapted to record the expanded partial images and the expanded mutually-different partial images; and
   a moving image generation unit configured to generate a moving image including the expanded partial images and the expanded mutually-different partial images recorded.

2. The moving image generation apparatus according to claim 1, further comprising a region specification unit configured to specify the points in the image displayed on the touch sensitive image display unit.

3. The moving image generation apparatus according to claim 2, wherein
   the region specification unit is further configured to specify a trail connecting a plurality of arbitrary points in the image displayed on the touch sensitive image display unit, and
   the partial image cutout unit sequentially calculates a direction and an amount of position variation per unit time since a starting point to an end point of the trail, and cuts out the plurality of mutually-different partial images from between the two arbitrary partial images based on the calculated direction and amount of position variation.

4. The moving image generation apparatus according to claim 1, wherein the partial image specification unit detects a face image in each of the two points and specifies a partial image in a predetermined range including the detected face image.

5. The moving image generation apparatus according to claim 4, wherein the partial image cutout unit cuts out mutually-different partial images in which variation in expression is great in the face image detected by the partial image specification unit, from among the two partial images.

6. The moving image generation apparatus according to claim 1, wherein the partial image cutout unit cuts out mutually-different partial images having positions and sizes obtained by linearly interpolating a position and a size of each of the two partial images.

7. A moving image generation method comprising:
causing a touch sensitive image display unit to (1) display a recorded still image and (2) receive user input;
causing a partial image specification unit to specify a partial image in a predetermined range in the recorded still image displayed on the touch sensitive image display unit corresponding to each of two points, separately touched by a user, of the recorded still image displayed on a touch sensitive display unit, the partial image specification unit displaying frames indicating each of the two points specified in the recorded still image displayed on the touch sensitive image display unit;
causing a partial image cutout unit to cut out a plurality of mutually-different partial images from between two partial images included in the partial images specified by the partial image specification unit, a cutout position of each of the plurality of mutually-different partial images being based on touch positions of a slide operation on the touch sensitive image display unit by the user;
causing an image processing unit to expand (1) each of the two partial images, specified by the partial image specification unit, to a size of the recorded still image, and (2) each of the mutually-different partial images, cut out by the partial image cutout unit, to the size of the recorded still image, to thereby generate expanded partial images and expanded mutually-different partial images;
causing a recording unit to record the expanded partial images and the expanded mutually-different partial images; and
causing a moving image generation unit to generate a moving image including the expanded partial images and the expanded mutually-different partial images recorded.

8. A method for use with a camera, the method comprising:
displaying, on a touch sensitive display of the camera, a recorded still image captured by the camera;
receiving, via a user input on the touch sensitive display of the camera, a user touch input;
responsive to the received user touch input, determining, with the camera, at least two separate face positions within the recorded still image displayed on the touch sensitive display of the camera;
displaying frames indicating each of the two points specified in the recorded still image displayed on the touch sensitive image display unit;
cropping, with the camera, the recorded still image to define at least two different partial images respectively including the at least two face positions determined;
generating, with the camera, at least one transitional image from the recorded still image based on touch positions of a slide operation on the touch sensitive image display unit between the at least two partial images by the user;
expanding (1) each of the at least two different partial images to a size of the recorded still image, and (2) each of the at least one transitional image to the size of the recorded still image, to thereby generate at least two expanded partial images and at least one expanded transitional image;
recording, with the camera, the at least two expanded partial images and the at least one expanded transitional image in association with the imaged image; and
generating a moving image including the at least two expanded partial images and the at least one expanded transitional image.

9. The moving image generation apparatus according to claim 1, wherein the cutout position of each of the plurality of mutually-different partial images is based on a direction of the slide operation.

10. The moving image generation method of claim 7, wherein the cutout position of each of the plurality of mutually-different partial images is based on a direction of the slide operation.

11. The method of claim 8 wherein the at least one transitional image is generated from the image is based on a direction of the slide operation.

12. The moving image generation apparatus according to claim 1, wherein moving image generated provides a simulated effect of panning across multiple objects in the recorded still image.

13. The moving image generation method of claim 7, wherein the moving image generated provides a simulated effect of panning across multiple objects in the recorded still image.

14. The method of claim 8 wherein the moving image generated provides a simulated effect of panning across multiple objects in the recorded still image.

* * * * *